United States Patent
Smallwood et al.

(10) Patent No.: US 6,347,508 B1
(45) Date of Patent: Feb. 19, 2002

(54) COMBUSTOR LINER SUPPORT AND SEAL ASSEMBLY

(75) Inventors: Michel Shawn Smallwood; Jack D. Petty, Sr.; Edward Claude Rice, all of Indianapolis, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/532,253

(22) Filed: Mar. 22, 2000

(51) Int. Cl.[7] .................................................. F02C 7/20
(52) U.S. Cl. ..................... 60/39.31; 60/39.31
(58) Field of Search ............................. 60/39.31, 39.32, 60/39.75

(56) References Cited

U.S. PATENT DOCUMENTS

| | | | |
|---|---|---|---|
| 2,720,079 A | * 10/1955 | Mines | 60/39.32 |
| 2,722,801 A | * 11/1955 | Lombard | 60/39.32 X |
| 3,826,088 A | * 7/1974 | Nash et al. | 60/39.32 X |
| 3,965,066 A | 6/1976 | Sterman et al. | 60/39.32 |
| 4,180,972 A | 1/1980 | Herman et al. | 60/39.32 |
| 4,361,296 A | * 11/1982 | Hall et al. | 60/39.31 X |
| 4,365,470 A | 12/1982 | Matthews et al. | 60/39.32 |
| 4,679,400 A | 7/1987 | Kelm et al. | 60/722 |
| 4,785,623 A | * 11/1988 | Reynolds | 60/39.32 |
| 4,798,514 A | 1/1989 | Pask | 4151/115 |
| 4,864,818 A | * 9/1989 | Taylor | 60/39.32 X |
| 4,932,207 A | 6/1990 | Harris et al. | 60/39.32 |
| 5,056,988 A | 10/1991 | Corsmeier et al. | 415/173.2 |
| 5,118,120 A | 6/1992 | Drerup et al. | 277/176 |
| 5,125,796 A | 6/1992 | Cromer | 415/174.2 |
| 5,141,393 A | 8/1992 | Marra | 415/138 |
| 5,154,577 A | 10/1992 | Kellock et al. | 415/170.1 |
| 5,186,006 A | 2/1993 | Petty | 60/753 |
| 5,188,507 A | 2/1993 | Sweeney | 415/173.1 |
| 5,289,677 A | 3/1994 | Jarrell | 60/39.31 |
| 5,291,732 A | 3/1994 | Halila | 60/39.31 |
| 5,320,487 A | 6/1994 | Walker et al. | 415/173.3 |
| 5,328,328 A | 7/1994 | Charbonnel et al. | 415/173.7 |
| 5,332,358 A | 7/1994 | Hemmelgarn et al. | 415/174.5 |
| 5,380,154 A | 1/1995 | Norton et al. | 415/209.2 |
| 5,398,496 A | 3/1995 | Taylor et al. | 60/39.31 |
| 5,480,162 A | * 1/1996 | Beeman, Jr. | 60/39.32 X |
| 5,509,669 A | 4/1996 | Wolfe et al. | 277/167.5 |
| 5,560,198 A | 10/1996 | Brewer et al. | 60/261 |
| 5,577,887 A | 11/1996 | Gouyon et al. | 415/174.2 |
| 5,586,773 A | 12/1996 | Bagepalli et al. | 277/167.5 |
| 5,639,211 A | 6/1997 | Bintz | 415/173.7 |
| 5,709,530 A | 1/1998 | Cahill et al. | 415/170.1 |
| 5,848,874 A | * 12/1998 | Heumann et al. | 60/39.31 X |

* cited by examiner

Primary Examiner—Charles G. Freay
(74) Attorney, Agent, or Firm—Woodard, Emhardt, Naughton, Moriarty & McNett

(57) ABSTRACT

The present invention contemplates an apparatus for supporting an annular combustor liner in a gas turbine engine. In one embodiment, the apparatus includes a plurality of radial lugs extending outwardly from an outer surface of the combustor liner and being spaced circumferentially and uniformly about a periphery of the combustor liner. A band is disposed about the outer surface of the combustor liner and coupled to the radial lugs. The radial lugs each include a radially extending slot having opposing circumferentially facing radial surfaces. The band includes a plurality of pins, each pin being disposed within a respective one of the slots. The pin is configured to bear against at least one of the radial surfaces to provide circumferential support to the combustor liner by substantially preventing relative circumferential movement between the combustor liner and the band. The pin is slidable between the radial surfaces to allow relative radial movement between the combustor liner and the band.

38 Claims, 6 Drawing Sheets

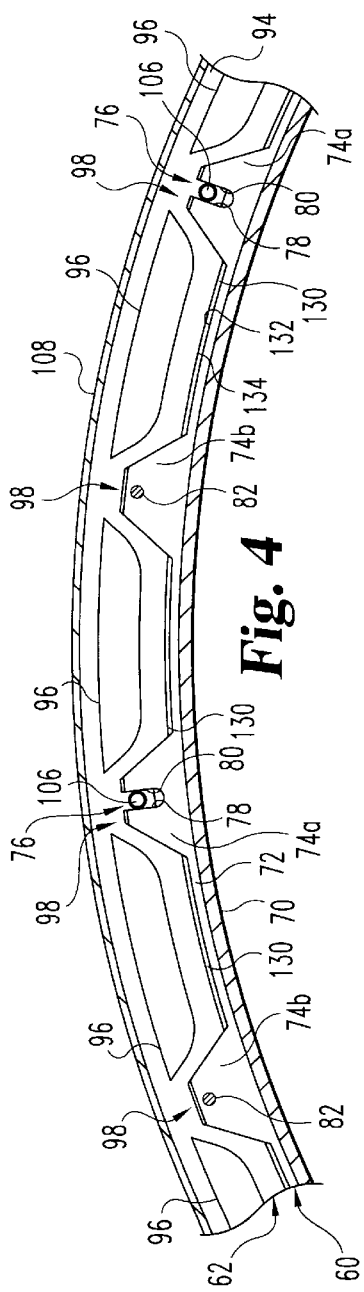

COMBUSTOR LINER SUPPORT AND SEAL ASSEMBLY

This invention was made with United States Government support under Contract N00019-96-C-0176 awarded by the United States Navy, and the United States Government may have certain rights in the invention.

BACKGROUND OF THE INVENTION

The present invention relates generally to gas turbine engines. More particularly, the present invention relates to a combustor liner support assembly for disposition within a gas turbine engine. Although the present invention was developed for use in a gas turbine engine, certain applications of the invention may fall outside of this field.

A gas turbine engine is typical of the type of turbo machinery in which the present invention described herein may be advantageously employed. It is well known that a gas turbine engine conventionally comprises a compressor for compressing inlet air to an increased pressure. A mixture of fuel and increased pressure air is ignited and burned in the combustor to generate a high temperature gaseous flow stream which is discharged from the combustor and directed by a series of turbine vanes to a series of turbine blades. The turbine blades convert the thermal energy from the high temperature gaseous flow stream into rotational kinetic energy, which in turn drives the compressor and a propeller, fan or other similar device. Alternatively, the high temperature gaseous flow stream may be used directly as a thrust for providing motive force, such as in a turbine jet engine.

In a typical gas turbine engine, relatively low pressure combustor gases flow through the interior of an annular combustor liner. Higher pressure compressor discharge cooling gas flows across the exterior of the combustor liner to lower the temperature of the liner by way of conventional film cooling and/or impingement cooling. The combustor liner is commonly supported at its upstream end, and its downstream end is allowed to float relative to the first turbine vane or nozzle. In such a support arrangement, a seal is sometimes provided in the area between the downstream end of the combustor liner and the turbine nozzle to restrict passage of the high pressure cooling gas into the flow path of the low-pressure combustor gases. However, different thermal coefficients of expansion between the combustor liner and the turbine nozzle results in increased sealing difficulties in this area of the gas turbine engine. More specifically, various components of the combustor and turbine sections thermally expand and contract at different rates. Thus, a seal disposed between the combustor and turbine sections must accommodate for thermal expansion and contraction to avoid, or at least minimize, damage to the combustor liner or the first turbine vane and prevent an unacceptably short useful life thereof.

Additionally, during the operation of the gas turbine engine, the combustor liner serves as the inner wall of a pressure vessel that must withstand the pressure differential between the high pressure cooling gas and the low pressure combustor gases. This pressure differential imposes a buckling load on the combustor liner, which in turn must be suitably configured to resist inward deflection. This is sometimes accomplished, for example, by increasing the thickness of the liner to correspondingly increase its hoop strength. However, this usually creates undesirable higher thermal gradients and hoop stresses within the liner, which can lead to low cycle fatigue (LCF), possibly resulting in liner failure or a shortened useful liner life. Alternatively, an annular support having a high moment of inertia is sometimes attached directly to the outside of the combustor liner to provide sufficient support to resist buckling. However, different thermal coefficients of expansion between the liner and the annular support again leads to undesirable higher thermal gradients and stresses within the liner.

Heretofore, there has been a need for a combustor liner support assembly which accommodates for the thermal cycle operation inherent in a gas turbine engine. An effective means for satisfying this need has escaped those skilled in the art. The present invention satisfies this need in a novel and unobvious way.

SUMMARY OF THE INVENTION

One form of the present invention contemplates a combustor liner support assembly for a gas turbine engine.

In another form of the present invention, a gas turbine engine includes an annular combustor having a combustor liner, and a plurality of circumferentially spaced apart projections extending from the combustor liner. A ring is disposed about the combustor liner and positioned adjacent the projections. Each of the projections engages a corresponding circumferentially facing portion of the ring and circumferentially supports the combustor liner while allowing relative radial displacement between the combustor liner and the ring.

In a further form, an apparatus is provided for supporting an annular combustor liner in a gas turbine engine. The apparatus includes a number of lugs spaced circumferentially about the combustor liner and extending from an outer surface of the combustor liner. A band is disposed about the combustor liner and is coupled to the lugs. One of the band and the lugs defines a plurality of radial slots, while the other defines a complementary portion disposed within each of the radial slots to provide circumferential support to the combustor liner while allowing relative radial movement between the combustor liner and the band.

In still another form, a combustor support assembly in a gas turbine engine includes a combustor liner extending along a flow path. A support member is disposed about the periphery of the combustor liner and is coupled thereto. One of the combustor liner and the support member defines a plurality of projections spaced about the periphery of the combustor liner, while the other defines a plurality of pairs of opposing surfaces extending in a transverse direction and correspondingly spaced about the periphery of the combustor liner. Each of the projections is disposed between a corresponding pair of opposing surfaces and bears against at least one of the opposing bearing surfaces to provide peripheral support to the combustor liner while being displaceable between the opposing surfaces to allow relative movement between the combustor liner and the support member in a transverse direction.

Further forms, embodiments, objects, features, advantages, benefits, and aspects of the present invention shall become apparent from the drawings and descriptions provided herein.

BRIEF DESCRIPTION OF THE DRAWINGS

FIG. 3a is an exploded view of the combustor liner support and seal assembly of FIG. 2a.

FIG. 3a is an exploded view of the combustor liner support and seal assembly of FIG. 2b.

FIG. 4 is a sectional view of the combustor liner support and seal assembly illustrated in FIG. 2a, taken along line 44 of FIG. 2a.

FIG. 5 is a sectional view of the combustor liner support and seal assembly illustrated in FIG. 2b, taken along line 5—5 of FIG. 2b.

FIG. 6 is a sectional view of the combustor liner support and seal assembly illustrated in FIG. 2b, taken along line 6—6 of FIG. 2b.

DESCRIPTION OF THE PREFERRED EMBODIMENTS

Figure 1:
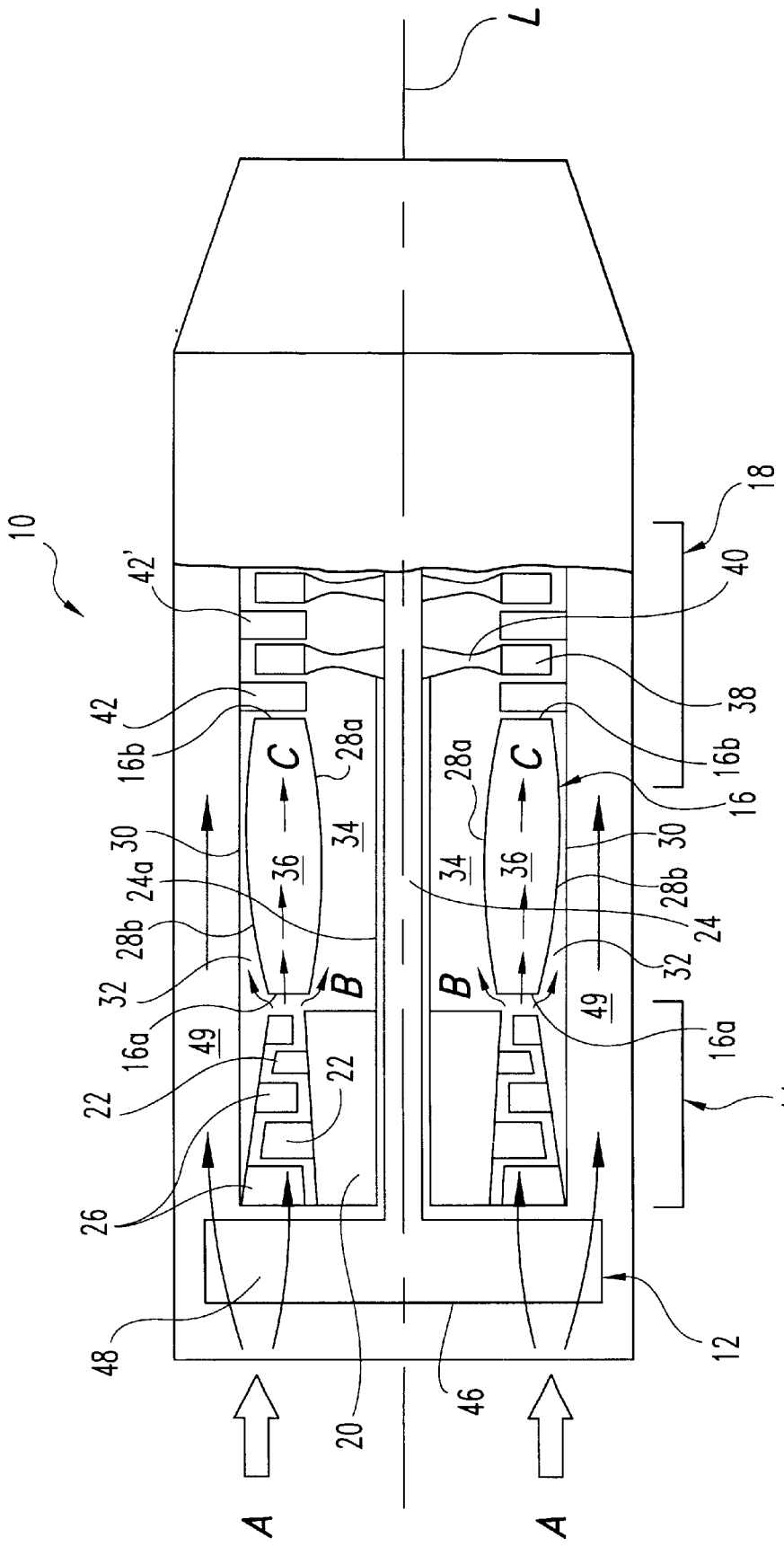
FIG. 1 is a schematic representation of a gas turbine engine.

For the purposes of promoting an understanding of the principals of the invention, reference will now be made to the embodiment illustrated in the drawings and specific language will be used to describe the same. It will nevertheless be understood that no limitation of the scope of the invention is hereby intended, and any alterations and further modifications of the illustrated device, and any further applications of the principals of the invention as illustrated herein being contemplated as would normally occur to one skilled in the art to which the invention relates.

With reference to FIG. 1, there is illustrated a schematic representation of a gas turbine engine 10. Gas turbine engine 10 includes a longitudinal axis L extending generally along the high temperature gaseous flow stream and has a generally annular configuration; however, other configurations are also contemplated as would occur to one of ordinary skill in the art. Gas turbine engine 10 includes a fan section 12, a compressor section 14, a combustor section 16, and a turbine section 18 that are integrated to produce an aircraft flight propulsion engine. This particular type of gas turbine engine is generally referred to as a turbo-fan. An alternate form of a gas turbine engine includes a compressor, a combustor, and a turbine integrated to produce an aircraft flight propulsion engine without a fan section. It should be understood that the term aircraft is generic, and includes helicopters, airplanes, missiles, unmanned space devices and other substantially similar devices. It is also important to realize that there are a multitude of ways in which gas turbine engine components can be linked together to produce a flight propulsion engine. For instance, additional compressor and turbine stages could be added with intercoolers connected between the compressor stages. Moreover, reheat combustion chambers could be added between the turbine stages.

It should be understood that the invention described herein is applicable to all types of gas turbine engines and is not intended to be limited herein to the gas turbine engine schematic represented in FIG. 1. For example, a gas turbine engine is equally suited to be used in industrial applications, such as pumping sets for gas and oil transmission lines, electricity generation, and naval propulsion.

The compressor section 14 includes a rotor 20 having a plurality of compressor blades 22 coupled thereto. The rotor 20 is affixed to a shaft 24a that is rotatable within the gas turbine engine 10. A plurality of compressor vanes 26 are positioned adjacent the compressor blades 22 to direct the flow of air through compressor section 14. Combustor section 16 includes an inner combustor liner 28a spaced radially inward from an outer combustor liner 28b so as to define the inner and outer boundaries of an annular combustion chamber 36. The outer combustor liners 28b is concentrically mounted relative to an outer pail casing or housing 30 to define an annular fluid passage 32, and the inner combustor liner 28a is concentrically mounted relative to shaft 24a to define an annular fluid passage 34. Fuel is introduced into combustion chamber 36 via a number of fuel nozzles (not shown).

Turbine section 18 includes a plurality of turbine blades 38 coupled to a rotor disk 40, which in turn is affixed to the shaft 24. A plurality of turbine vanes 42 and 42' are positioned adjacent the turbine blades 38 to direct the flow of the hot gaseous fluid stream through turbine section 18. A turbine nozzle 44 (FIGS. 2a and 2b) is defined by the plurality of turbine vanes 42, positioned after the combustor section 16 to direct the hot gaseous fluid stream exiting the combustion chamber 36 toward the turbine blades 38. In a preferred embodiment, the gaseous fluid comprises air.

In operation, the turbine section 18 provides rotational power to shafts 24 and 24a, which in turn drive the fan section 12 and the compressor section 14, respectively. The fan section 12 includes a fan 46 having a plurality of fan blades 48. Air enters the gas turbine engine 10 in the direction of arrows A, passes through the fan section 12, and is fed into the compressor section 14 and a bypass duct 49. The compressed air exiting compressor section 14 is routed into combustion chamber 36 and annular fluid passages 32, 34 in the direction of arrows B. The air enters the combustion chamber 36 at the forward end 16a of the combustor section 16 and is intermixed with fuel to provide an air/fuel mixture. The air/fuel mixture is ignited and burned to generate a hot gaseous fluid stream flowing along an axial flow path in the direction of arrow C. The hot gaseous fluid stream exits the aft end 16b of the combustor section 16 and is fed into the turbine section 18 to provide the energy necessary to power the gas turbine engine 10. During normal operation of gas turbine engine 10, the cooling air flowing through passages 32, 34 is at a higher pressure than the hot gaseous air stream flowing through combustion chamber 36.

Figure 2A:
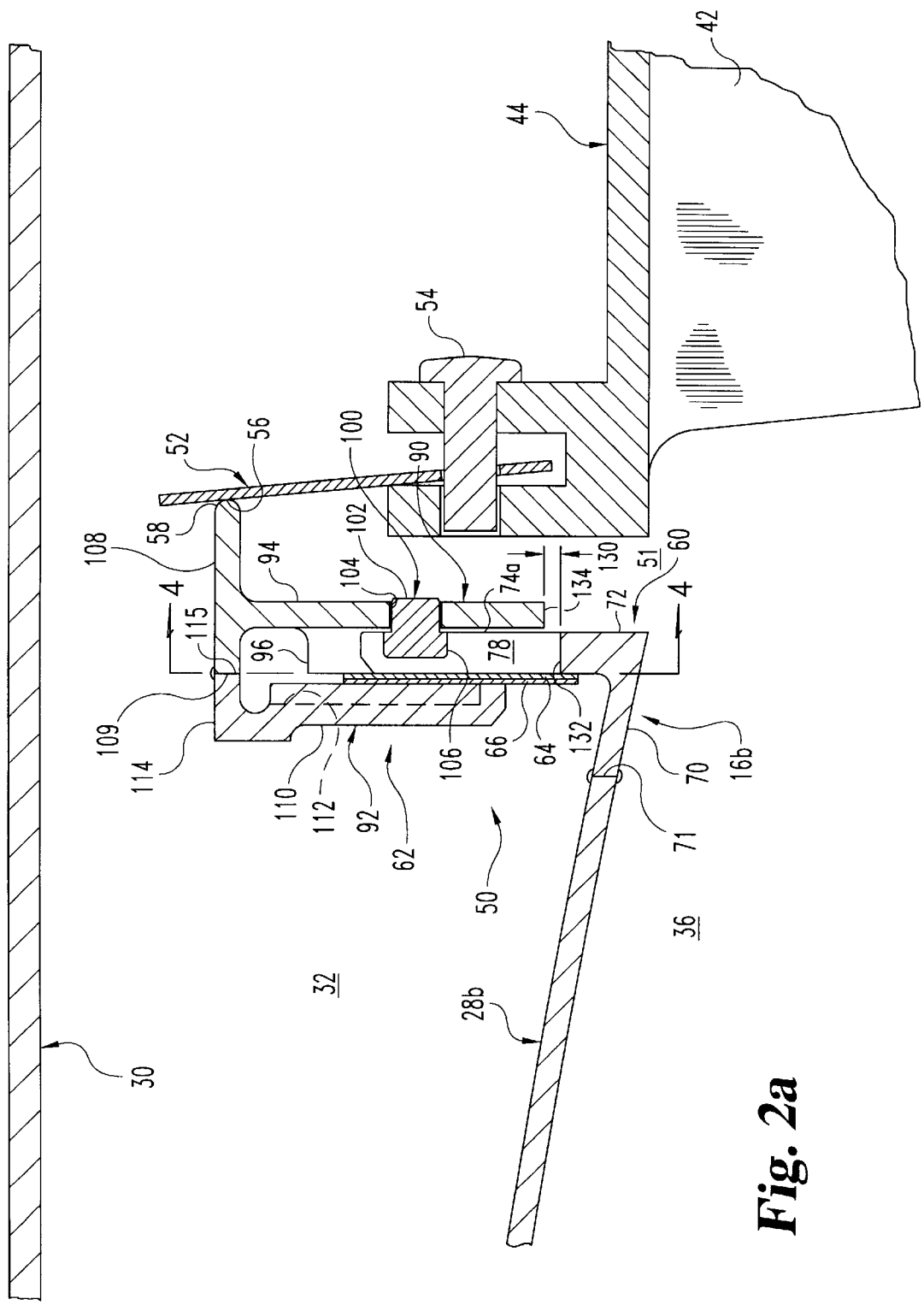
FIG. 2a is a sectional view of a portion of a gas turbine engine at the interface between the combustor and turbine section, illustrating one embodiment of a combustor liner support and seal assembly.
Figure 2B:
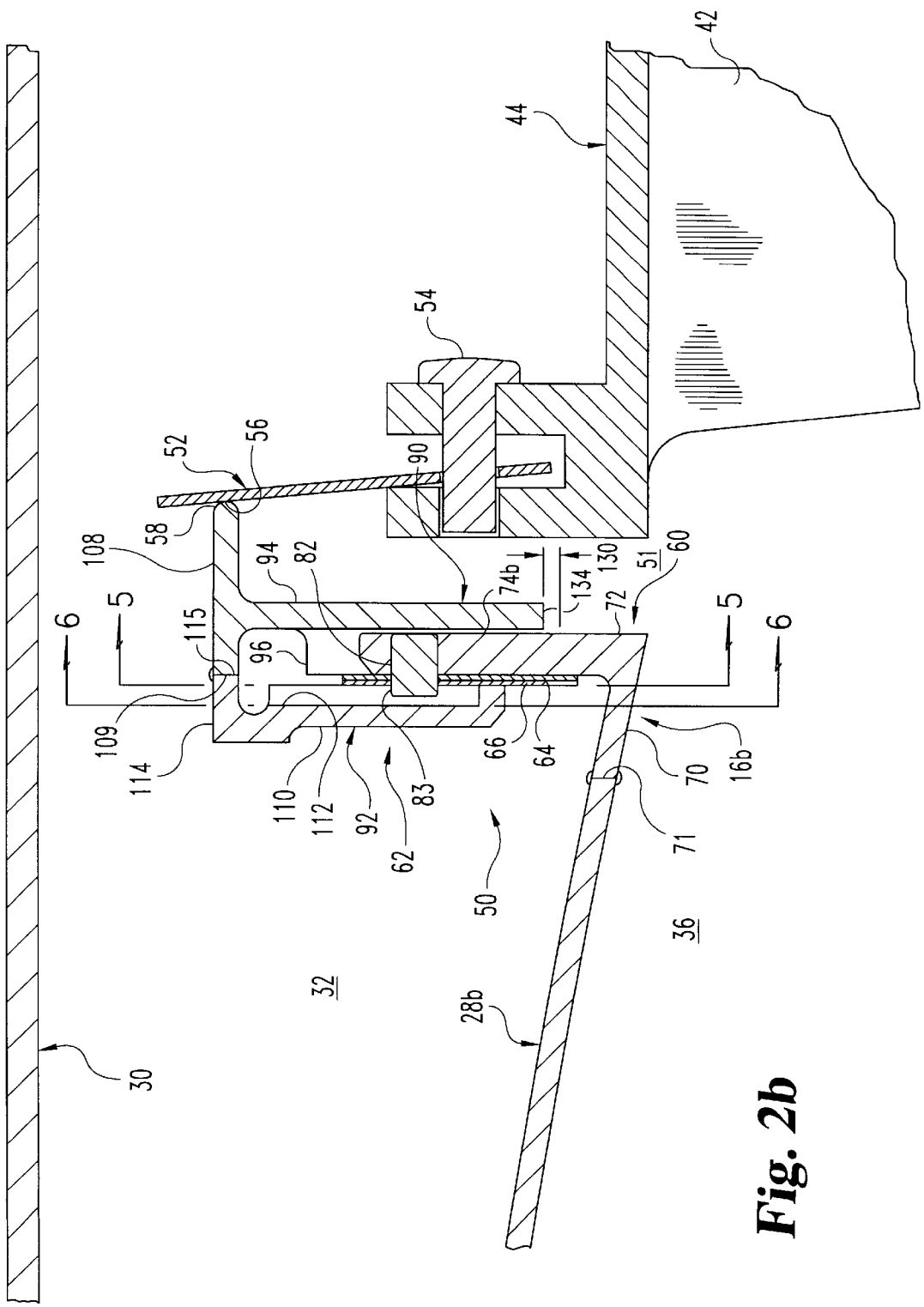
FIG. 2b is a sectional view of another portion of a gas turbine engine at the interface between the combustor and turbine section, illustrating one embodiment of a combustor liner support and seal assembly.
Figure 3A:
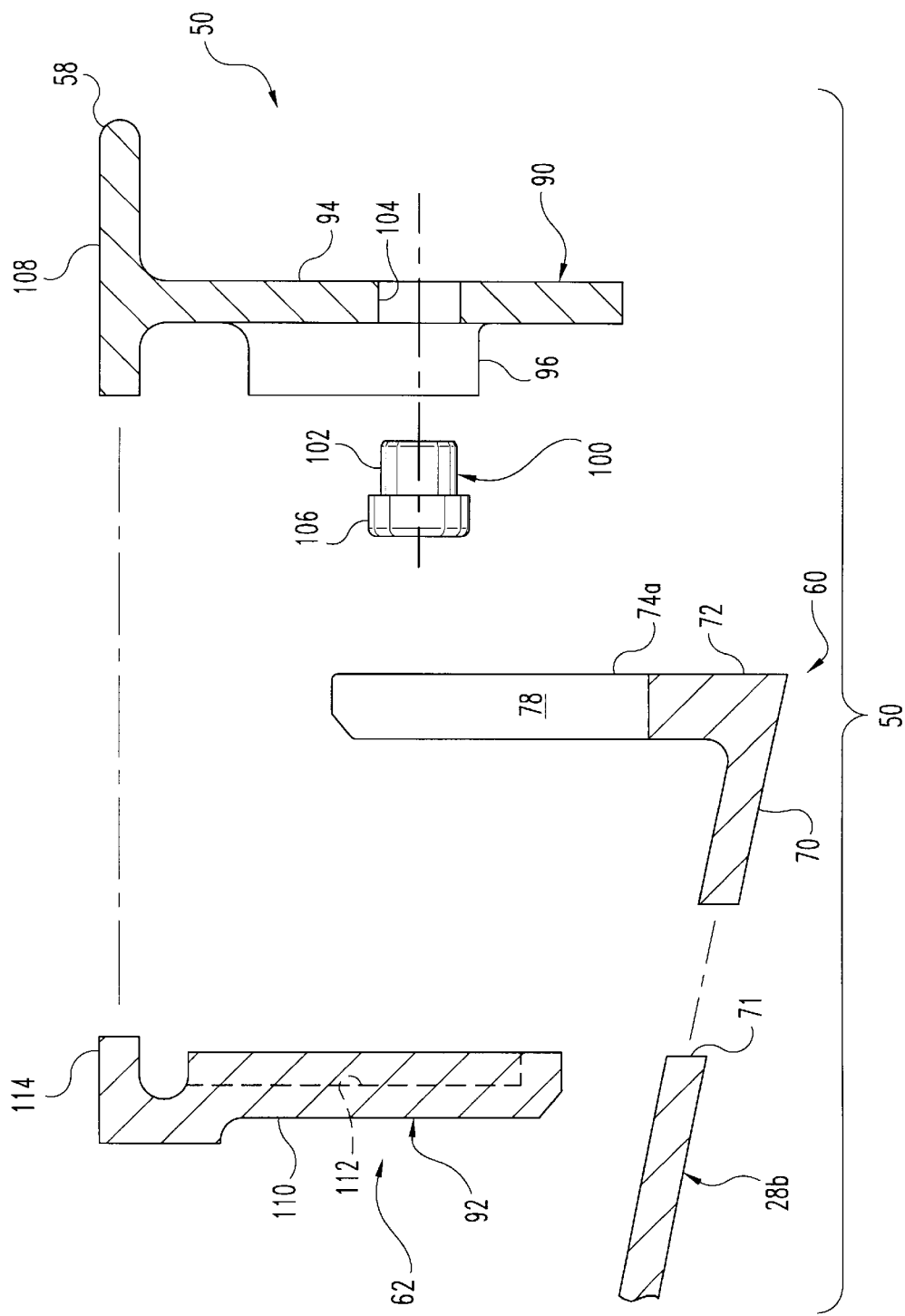
Figure 3B:
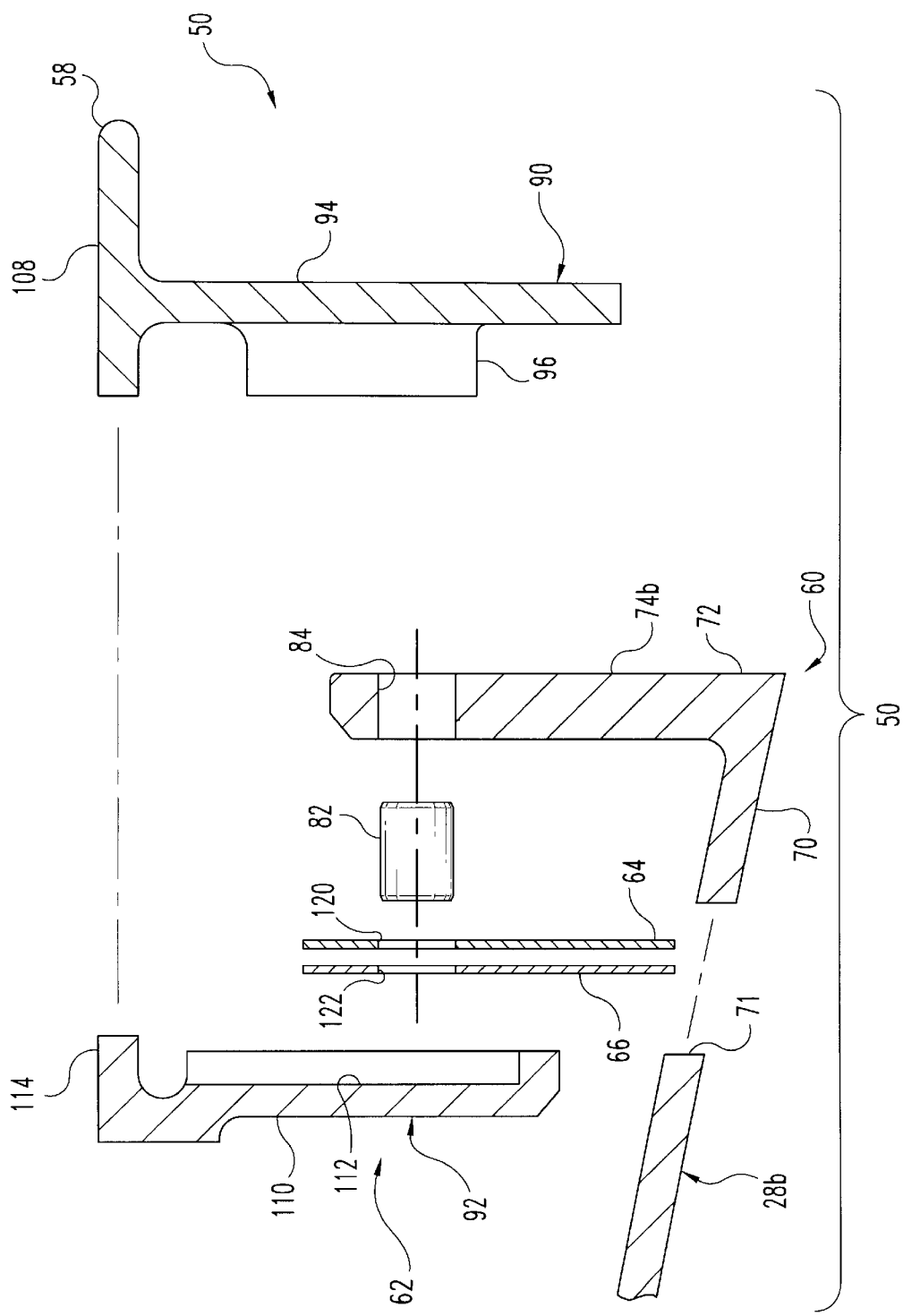

Referring now to FIGS. 2a and 2b, a combustor liner support assembly 50 is positioned about the periphery of the outer combustor liner 28b and is operably coupled thereto. In the illustrated embodiment, the combustor liner support assembly 50 is axially coupled to the aft end of liner 28b adjacent the turbine nozzle 44. It should be understood, however, that the combustor liner support assembly 50 could alternatively be coupled to liner 28b in other directions, or positioned at other axial locations along outer combustor liner 28b, including the forward end 16a of combustor section 16. The aft end 16b of liner 28b is spaced apart from the turbine nozzle 44 to define a passageway 51 therebetween.

A seal 52 is supported by an outer portion of the turbine nozzle 44 via a plurality of fasteners or pins 54. Seal 52 defines an annular sealing surface 56 which is engaged against an annular lip 58 defined by the liner support assembly 50 to seal off fluid flow between cooling air passage 32 and combustion chamber 36. It should be understood that the terms "seal" and "sealing" used herein are intended to have a broad meaning that includes a reduction in the passage of air, and do not necessarily require a one hundred percent reduction in fluid flow, unless specifically provided to the contrary. During axial thermal expansion and contraction of the liner 28b relative to the turbine nozzle 44, the annular lip 58 will deflect or pivot the annular seal 52 about the fasteners 54, thus maintaining engagement with the annular sealing surface 56. Similarly, during radial thermal expansion and contraction of the liner 28b, the annular lip 58 will slide radially along the annular sealing surface 56, thus maintaining the seal therebetween. It should be understood that other types and configurations of sealing arrangements between combustor section 16 and turbine section 18 are also contemplated, such as, for example, the sealing arrangement disclosed in U.S. patent application entitled "Combustor Seal Assembly" and filed on the same day as the subject application, the contents of which are hereby incorporated by reference.

The inner and outer liners 28a, 28b are each formed of materials that are capable of withstanding high temperature environments. Materials such as metallic superalloys and inter-metallic materials, and structures such as Lamilloy®, are contemplated as being within the scope of the invention. The inner and outer liners 28a, 28b have a high temperature capability to withstand the hot gaseous fluid stream flowing through the combustion chamber 36, but typically have a low hoop strength due to their minimal thickness. Thus, liners 28a, 28b, and specifically outer liner 28b, require circumferential support to resist mechanical buckling which might occur in response to a pressure differential existing between the cooling air passage 32 and the combustion chamber 36.

In the embodiment illustrated in FIGS. 2a and 2b, the combustor section 16 is axially and radially supported toward forward end 16a (FIG. 1), and the aft end 16b is allowed to axially and radially float relative to the turbine nozzle 44. The outer liner 28b is supported toward the aft end 16b by the liner support assembly 50. In one form of the invention, the outer liner 28b is circumferentially or peripherally supported by the liner support assembly 50. The liner support assembly 50 may be formed of components having different coefficients of thermal expansion than that of outer liner 28b, and preferably has a higher moment of inertia than that of outer liner 28b to provide adequate circumferential support thereto. However, it should be understood that the components of liner support assembly 50 could have the same coefficient of thermal expansion and/or the same moment of inertia as outer liner 28b. As will become apparent below, the liner support assembly 50 is configured to accommodate for differences in thermal growth between the outer liner 28b and the liner support assembly 50 to reduce thermal gradients and hoop stresses within outer liner 28b, thereby increasing the low cycle fatigue (LCF) life of the outer liner 28b.

Referring collectively to FIGS. 2–6, the liner support assembly 50 includes an inner mounting ring 60 and an outer support ring 62, each positioned about the periphery of the outer liner 28b. Preferably, inner mounting ring 60 and outer support ring 62 are positioned concentric to one another. Inner mounting ring 60 and outer support ring 62 are each formed of a material capable of withstanding high temperature environments and capable of circumferentially supporting the combustor liner; materials such as, but not limited to metallic superalloys are contemplated herein. The liner support assembly 50 also includes a pair of overlapping, inner and outer annular leaf seals 64, 66 disposed between the mounting ring 60 and the support ring 62.

Inner mounting ring 60 includes a circumferential flange 70 having a downstream end securely attached to the aft end 71 of outer liner 28b, preferably by welding, and an annular flange 72 extending outwardly from circumferential flange 70, preferably in a radial direction. A plurality of tangs or lugs 74a, 74b project outwardly from the annular flange 72, preferably in a radial direction, and are spaced about the periphery of the mounting ring 60 in an alternating fashion, preferably in a uniform spaced relation. In the illustrated embodiment, tangs 74a, 74b are trapezoidal-shaped; however, other shapes are also contemplated, such as, for example, square, rectangular or other polygonal shapes. Each of the lugs 74a includes a radially extending slot or groove 76 defining opposing, circumferentially facing radial surfaces 78, 80. Lugs 74b are disposed between lugs 74a and each includes a leaf seal retaining pin 82 secured within an axially extending opening 84, preferably by welding, and extending substantially perpendicularly therefrom.

Outer support ring 62 is free-standing, or in other words is not rigidly supported by the outer housing 30 or any other portion of gas turbine engine 10 other than the outer liner 28b. Instead, outer support ring 62 includes a pair of interconnected, opposing annular flanges 90, 92 disposed adjacent opposite sides of radial lugs 74a, 74b to axially couple support ring 62 to outer liner 28b. As the liner 28b thermally expands and contracts in an axial direction, the outer support ring 62 will be correspondingly displaced in an axial direction and will float relative to outer housing 30.

The annular flange 90 includes a web portion 94 extending in a radial direction and having a plurality of projections 96 extending toward annular flange 92 in an axial direction. In the illustrated embodiment, projections 96 are trapezoidal-shaped; however, other shapes are also contemplated, such as, for example, square, rectangular or other polygonal shapes. The projections 96 are preferably uniformly spaced about annular flange 90 so as to define a number of funnel-shaped channels 98 disposed between adjacent projections 96 (FIG. 4). Channel 98 is shaped complementary to the radial lugs 74a, 74b such that each lug is radially displaceable within a corresponding channel 98. Annular flange 90 includes a plurality of mounting pins or tongues 100, extending from web portion 94 in an axial direction toward annular flange 92. Preferably, a mounting pin 100 is centrally positioned within every other channel 98. Each of the mounting pins 100 includes a stem 102 secured within an opening 104 defined in web portion 94, preferably by welding, and a head 106 extending from stem 102 in an axial direction and disposed within a corresponding slot 76 in inner mounting ring 60 (FIG. 4). Preferably, head 106 is substantially circular; however, other shapes are also contemplated, such as, for example, an elliptical shape. Annular flange 90 further includes an outer, circumferential portion 108 that defines the axially extending aft end portion 58 which engages the annular seal 52 to seal off air flow between the cooling air passage 32 and the combustion chamber 36 (FIGS. 2a and 2b).

The annular flange 92 includes a radial portion 110 which defines a plurality of openings or recesses 112 (FIG. 6), preferably having a U-shape; however, other shapes are also contemplated as being within the scope of the invention. The recesses 112 are preferably circumferentially and uniformly spaced about radial portion 110 and aligned opposite the tangs 74b such that the distal end portions 83 of the leaf seal retaining pins 82 are disposed therein. Annular flange 92 also includes an outer circumferential portion 114 which has an aft end 115 securely connected to the forward end 109 of the circumferential portion 108 of annular flange 90, preferably by welding, so as to define a unitary outer support ring 52 (FIGS. 2a and 2b). It should be noted that the liner support assembly 50 must be completely assembled prior to joining annular flange 90 to annular flange 92 due to the projection of the distal end portions 83 of the leaf seal retaining pins 82 within the recesses 112. The disposition of the retaining pins 100 within recesses 112 radially couples the outer support ring 62 to the inner mounting ring 60, thereby preventing subsequent disengagement.

The annular leaf seals 64, 66 are supported between the tangs 74a, 74b of mounting ring 60 and the radial portion 110 of support ring 62, and are additionally supported by the projections 96 extending between tangs 74a, 74b. Referring specifically to FIG. 5, the inner and outer leaf seals 64, 66 are preferably segmented, defining a number of leaf seal segments 65, 67 which are placed in an adjoining relationship to define substantially continuous inner and outer annular leaf seals 64, 66. Each inner leaf seal segment 65 includes first and second ends 65a, 65b, which are preferably, but not necessarily, angled relative to a radius of annular leaf seal 64. Each inner leaf seal segment 65 has a hole 120 defined therethrough adjacent first end 65a. Inner leaf seal segments 65 are installed onto the inner mounting ring 60 by inserting the leaf seal retaining pins 82 through the holes 120 and arranging the inner seal segments 65 end-to-end, with the first end 65a abutting the second end 65b of an adjacent inner seal segment 65. Similarly, each outer leaf seal segment 67 includes first and second ends 67a, 67b, and has a slot 122 defined therethrough adjacent second end 67b. Outer leaf seal segments 67 are installed onto the inner mounting ring 60 by inserting the leaf seal retaining pins 82 through the slots 122 and arranging the seal segments 67 end-to-end, with the first end 67a abutting the second end 67b of an adjacent seal segment 67. As illustrated, inner and outer seal segments 65, 67 are arranged in an overlapping relationship. This overlapping feature serves to seal any gaps or voids that might exist at the interface between ends 65a, 65b of adjacent inner seal elements 65 and at the interface between ends 67a, 67b of adjacent outer seal elements 67.

The retaining pins 82 serve to radially support the leaf seal segments 65, 67, maintaining the radial position of each leaf seal segment 65, 67 relative to the inner mounting ring 60 while allowing a degree of circumferential movement therebetween. Thus, as the inner mounting ring 60 thermally expands and contracts in a radial direction, the leaf seal segments 65, 67 will be correspondingly displaced in a radial direction. Because annular leaf seals 64, 66 are segmented, any variations in the circumferential thermal expansion and contraction between the leaf seal segments 65, 67 and the inner mounting ring 60 are compensated for by the displacement of retaining pins 82 along slot 22. One function of the annular leaf seals 64, 66 is to seal the space or window 130 existing between each of the radial tangs 74a, 74b, specifically at the interface between the outwardly facing edge 132 of the inner mounting ring 60 and the inwardly facing edge 134 of the outer support ring 62 (FIGS. 2a, 2b and 4). Another function of the leaf seals 64, 66 is to shield the annular flange 72 and the tangs 74a, 74b from the direct impingement of cooling air flowing through air passage 32, thus reducing radial thermal gradients which otherwise might exist within inner mounting ring 60.

The function and operation of the combustor liner support assembly 50 will now be set forth under the assistance of FIGS. 1–6. Referring to FIGS. 2a and 2b, during the operation of the gas turbine engine 10, the outer combustor liner 28b serves as the outer wall of a pressure vessel that must withstand a pressure differential between the high pressure cooling air flowing through the cooling air passage 32 and the low pressure combustion gases flowing through the combustion chamber 36. Because the outer liner 28b is preferably formed of a ductile material having a relatively low moment of inertia, the pressure differential existing across liner 28b creates a buckling load which tends to cause inward deflection. The combustor liner support assembly 50 functions to circumferentially support the liner 28b, thereby resisting the bucking load and reducing the inward deflection of liner 28b. However, thermal transients are present during the operation of the gas turbine engine 10, resulting in the expansion and contraction of combustor liner 28b. Because the liner support assembly 50 has a coefficient of thermal expansion and/or a temperature profile which is significantly different than that of combustor liner 28b, the liner support assembly 50 is configured to allow the liner 28b to freely expand and contract in a radial direction.

To more fully describe the function and operation of the liner support assembly 50, reference will now be made to FIGS. 2a, 2b and 4. The outer combustor liner 28b is primarily supported by the inner mounting ring 60. Inner mounting ring 60 is a lightweight structure with a relatively low moment of inertia, preferably having a coefficient of thermal expansion substantially equal to that of liner 28b. Thus, mounting ring 60 permits substantially unrestrained radial thermal expansion of liner 28b with a minimal development of hoop stresses therein. Outer support ring 62, which may have a higher moment of inertia than that of inner mounting ring 60, provides secondary support to liner 28b to resist the buckling load exerted thereon.

Specifically, the mounting pins 100 of outer support ring 62 are slidably disposed within the slots 76 of inner mounting ring 60. The circumferentially facing portion of head 106 engages and bears against either or both of the opposing, radially extending surfaces 78 and 90 of slot 76. Circumferential and radial restraint of the combustor liner 28b relative to the outer support ring 62 is accomplished through the tongue-and-groove arrangement existing between the head 106 and the radial surfaces 78, 80. This cross-key type mounting arrangement between liner 28b and outer support ring 62 prevents circumferential movement of the liner 28b relative to support ring 62, thereby providing circumferential/peripheral support to the liner 28b. Should the combustor liner 28b start to inwardly deflect in response to a buckling load, the lateral engagement of the circular head 106 on the radial surfaces 78, 80 will transfer the load tangentially to the outer support ring 62, thereby increasing the effective moment of inertia of the liner 28b. This increase in the effective moment of inertia provides strength and rigidity to the combustor liner 28b to resist mechanical buckling.

As the combustion liner 28b radially expands and contracts in response to the thermal cycle operation of gas turbine engine 10, the inner mounting ring 60 will be correspondingly displaced in a radial direction. Since the outer support ring 62 has a higher moment of inertia than that of liner 28b and inner mounting ring 60, and has a higher coefficient of thermal expansion and/or thermal mass, the outer support ring 62 will thermally expand and contract at a slower rate. To compensate for this variation in radial expansion and contraction, the head 106 of mounting pins 100 is slidably displaced along the length of radial slots 76, thus allowing relative radial displacement between inner mounting ring 60 and outer support ring 62. The substantially unrestrained radial thermal movement of inner mounting ring 60 and liner 28b reduces undesirable hoop stresses from developing within liner 28b which might otherwise result in low cycle fatigue (LCF) and the eventual failure of liner 28b.

It has thus been shown how the liner support assembly 50 provides rigidity and support to outer combustor liner 28b to resist mechanical buckling, while allowing substantially unrestrained radial expansion and contraction of liner 28b to provide an acceptable LCF life. It has also been shown that the liner support assembly 50 is not rigidly supported by outer housing 30, but is instead axially coupled to the combustor liner 28b. Because the liner support assembly 50 is essentially free-standing, there is no need to accommodate for thermal movement of the liner support assembly 50 relative to other components of the gas turbine engine 10, such as outer housing 30, thus allowing for a simpler overall design of combustor section 16.

Although the liner support assembly 50 has been illustrated and described for use with the outer combustor liner 28b, it should be understood that liner support assembly 50 can also be used in conjunction with the inner combustor liner 28a or with other types and configurations of combustors as would be apparent to one of ordinary skill in the art. Since the inner combustor liner 28a is typically not subject to buckling loads of the magnitude existing across the outer liner 28b, mechanical buckling is not as prevalent. In this case, the interaction between the mounting pins 100 and the slots 76 serves more as a cross-key arrangement for maintaining proper alignment and positioning of the inner liner 28a relative to outer support ring 62. Also, the liner support assembly 50 provides additional circumferential support to the inner liner 28a, thus allowing the inner liner 28a to be fabricated from thinner material than would otherwise be possible.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A combination, comprising:
   a gas turbine engine including an annular combustor, said annular combustor having a combustor liner;
   a plurality of circumferentially spaced apart projections extending from said combustor liner;
   a free-standing ring disposed about said combustor liner and positioned adjacent said plurality of projections; and
   wherein a number of said projections engage a corresponding circumferentially facing portion of said ring and circumferentially support said combustor liner while allowing relative radial displacement between said combustor liner and said ring.

2. The combination of claim 1 wherein one of said ring and said number of projections defines a plurality of grooves extending in a radial direction, another of said ring and said number of projections defining a plurality of tongues extending in a radial direction, each of said tongues being slidably received within respective ones of said grooves and circumferentially engaging a portion of said groove to provide said circumferential support to said combustor liner while allowing said relative radial displacement.

3. The combination of claim 2 wherein said tongues are pins having a substantially circular cross-section and extending axially from said another of said ring and said number of projections.

4. The combination of claim 1 wherein said ring includes a radially extending flange and a plurality of pins extending from said flange toward said number of projections, each of said number of projections defining a radially extending slot, each of said pins being slidably disposed within a respective slot to provide said circumferential support to said combustor liner while allowing said relative radial displacement.

5. The combination of claim 4 wherein said ring defines a second radially extending flange, said radially extending flanges disposed on opposite sides of at least one of said plurality of projections to couple said ring to said combustor liner.

6. The combination of claim 1 further comprising an annular seal engaged against an axially facing portion of each of said plurality of projections.

7. The combination of claim 6 wherein a number of said plurality of projections each includes a retaining pin extending from said axially facing portion, said annular seal defining a corresponding number of axial openings, said retaining pins being disposed within respective ones of said openings to maintain said annular seal in a radial position relative to said plurality of projections.

8. The combination of claim 7 wherein said annular seal is circumferentially segmented to define a plurality of interfacing seal segments, each of said interfacing seal segments defining one of said openings, said openings being slots having a length extending in a circumferential direction to allow relative circumferential movement between said seal segments and said plurality of projections.

9. The combination of claim 8 wherein said annular seal is an inner annular seal; and
   said combination further comprises an outer annular seal positioned axially adjacent said inner annular seal, said outer annular seal being circumferentially segmented to define a plurality of interfacing seal segments, each of said interfacing seal segments of said outer annular seal being configured similar to said interfacing seal segments of said inner annular seal; and
   wherein adjacent ones of said interfacing seal segments of said inner annular seal have an interface that is circumferentially offset from an interface of adjacent ones of said interfacing seal segments of said outer annular seal.

10. The combination of claim 6 wherein said support ring includes a pair of axially opposing annular flanges, a first of said flanges being engaged against one side of said annular seal, a second of said flanges includes a plurality of axial projections extending between adjacent pairs of said plurality of projections and being engaged against an opposite side of said annular seal, said first and second flanges providing axial support to said annular seal.

11. The combination of claim 6 wherein said annular seal extends across a space between adjacent ones of said plurality of projections to substantially prevent passage of fluid through said space.

12. The combination of claim 1 wherein said combustor liner is formed of a metallic material, and wherein said combustor liner has a thermal mass less than the thermal mass of said ring.

13. The combination of claim 12 wherein the thermal mass of said combustor liner is considerably less than the thermal mass of said ring.

14. The combination of claim 1 wherein said combustor liner is formed of a metallic material and has a coefficient of thermal expansion that is greater than the coefficient of thermal expansion of said ring.

15. The combination of claim 1 wherein said plurality of projections form a portion of a mounting ring, said mounting ring being disposed concentrically with said combustor liner and being securely attached thereto; and
   wherein said free-standing ring has a higher moment of inertia than said mounting ring.

16. The combination of claim 1 further comprising a turbine nozzle spaced apart from an aft end of said combustor liner to define a passageway therebetween, said turbine nozzle including an annular seal element coupled thereto; and wherein said ring includes an annular lip extending toward said turbine nozzle, said annular lip engaging said annular seal element to seal said passageway.

17. The combination of claim 1 wherein said ring is substantially circular and is disposed about an outer periphery of said combustor liner.

18. The combination of claim 1 wherein said plurality of projections extend outwardly from said combustor liner in a radial direction.

19. An apparatus for supporting an annular combustor liner in a gas turbine engine, comprising:

a plurality of lugs extending outwardly from an outer surface of said combustor liner and being spaced circumferentially about said combustor liner;

a band disposed about said outer surface of said combustor liner and being coupled to said plurality of lugs; and wherein one of said band and said lugs defines a plurality of radially extending slots, a complementary portion of another of said band and said lugs being disposed within each of said radial slots and circumferentially supporting said combustor liner while allowing relative radial movement between said combustor liner and said band.

20. The apparatus of claim 19 wherein each of said slots defines opposing circumferentially facing surfaces, said complementary portion engaging at least one of said opposing surfaces to substantially prevent relative circumferential movement between said combustor liner and said band, said complementary portion being displaceable along said opposing surfaces to allow said relative radial movement between said combustor liner and said band.

21. The apparatus of claim 19 wherein said band includes a radially extending flange, said complementary portions extending from said flange toward said plurality of lugs, each of said lugs defining one of said slots for receiving a corresponding one of said complementary portions therein, said corresponding one of said complementary portions being configured to bear against a circumferential surface of said one of said slot to tangentially mount said combustor liner to said band, said complementary portion being displaceable along said circumferential surface to allow said relative radial movement.

22. The apparatus of claim 21 wherein said complementary portion is a pin having a substantially circular outer surface and being configured to bear against said circumferential surface of said one of said slots.

23. The apparatus of claim 21 wherein said band includes a pair of opposing ones of said radially extending flange, at least one of said lugs being disposed between said pair of opposing flanges to couple said band to said combustor liner.

24. The apparatus of claim 23 wherein said pair of flanges extends annularly about said band.

25. The apparatus of claim 19 wherein said band is radially coupled to said plurality of radial lugs.

26. The apparatus of claim 19 wherein said combustor liner is formed of a metallic material having a coefficient of thermal expansion that is higher than a coefficient of thermal expansion of said band.

27. The apparatus of claim 19 wherein said plurality of lugs form a portion of a mounting ring, said mounting ring being disposed concentrically with said combustor liner and being securely attached thereto; and wherein said band has a higher moment of inertia than said mounting ring.

28. The apparatus of claim 19 wherein said band floats relative to other components of said gas turbine engine in a direction along said outer surface of said combustor liner.

29. The apparatus of claim 19 wherein said band is substantially circular and is disposed about the entire periphery of said combustor liner.

30. An apparatus for supporting an annular combustor liner in a gas turbine engine, comprising:

a plurality of circumferentially spaced apart projections extending from said combustor liner; and means for peripherally stiffening said combustor liner, said stiffening means cooperating with said plurality of projections to provide circumferential support to said combustor liner while allowing relative radial displacement therebetween, said stiffening means including means for coupling said stiffening means to said plurality of projections.

31. The apparatus of claim 30 further comprising means for sealing a passage between said stiffening means and said plurality of projections.

32. A combustor support assembly in a gas turbine engine, comprising:

a combustor liner forming a boundary of a combustion chamber extending along a flow path;

a support member disposed about the periphery of said combustor liner and being coupled thereto;

a plurality of projections defined by one of said combustor liner and said support member, said projections being spaced about the periphery of said combustor liner;

a plurality of pairs of opposing surfaces defined by another of said combustor liner and said support member, said opposing surfaces extending in a direction transverse to said flow path and being oriented in a direction generally along said flow path, each of said pairs of opposing surfaces being spaced about the periphery of said combustor liner to receive a respective one of said projections therebetween; and wherein said projections bear against at least one surface of said pairs opposing surfaces to provide peripheral support to said combustor liner and are displaceable between said pairs of opposing surfaces to allow relative movement between said combustor liner and said support member in a direction transverse to said flow path.

33. The combustor support assembly of claim 32 wherein said projections extend from said one of said combustor liner and said support member in a direction generally along said flow path.

34. The combustor support assembly of claim 33 wherein said projections are pins, said combustor liner having a plurality of tangs extending from said combustor liner in a direction transverse to said axial flow path, each of said tangs defining one of said pairs of opposing surfaces.

35. The combustor support assembly of claim 34 wherein said support member includes a pair of flanges disposed on opposite sides of at least one of said tangs to couple said support member to said combustor liner.

36. The combustor support assembly of claim 32 wherein said support member is free-standing.

37. The combustor support assembly of claim 32 wherein said combustor liner is formed of a metallic material having coefficient of thermal expansion that is higher than a coefficient of thermal expansion of said support member.

38. The combustor support assembly of claim 32 wherein said combustor liner is formed of a metallic material, and wherein said combustor liner has considerably less thermal mass than said support member.

* * * * *